(12) United States Patent
Douglas et al.

(10) Patent No.: US 8,858,075 B2
(45) Date of Patent: Oct. 14, 2014

(54) APPARATUS AND METHOD FOR REMOTE MONITORING

(75) Inventors: Dave Douglas, Montgomery, TX (US);
Jim Trippett, Longview, TX (US)

(73) Assignee: Indorama Ventures (Oxide & Glycois) LLC, Riverwoods, IL (US)

( * ) Notice: Subject to any disclaimer, the term of this patent is extended or adjusted under 35 U.S.C. 154(b) by 435 days.

(21) Appl. No.: 13/251,605

(22) Filed: Oct. 3, 2011

(65) Prior Publication Data

US 2012/0089361 A1 Apr. 12, 2012

Related U.S. Application Data

(60) Provisional application No. 61/390,898, filed on Oct. 7, 2010.

(51) Int. Cl.
*G01K 1/02* (2006.01)
*G01N 25/00* (2006.01)
*G01K 1/14* (2006.01)

(52) U.S. Cl.
CPC . *G01K 1/024* (2013.01); *G01K 1/14* (2013.01)
USPC ............. 374/208; 374/163; 374/141; 374/45; 374/4; 340/870.17

(58) Field of Classification Search
CPC ......... C08L 5/14; C08L 2666/26; C08L 1/02; C08L 29/04; C08L 2666/04; C08L 2201/06; G03G 9/08755; G03G 5/04; G03G 5/047; G03G 5/06; G03G 9/0804; G01N 1/28; G01N 1/312; G01N 21/95; G01N 25/26; G01N 33/241; G01N 33/573
USPC .................... 374/4, 148, 208, 141, 142, 143, 374/147–14, 163, 179, 100; 340/870.17
See application file for complete search history.

(56) References Cited

U.S. PATENT DOCUMENTS

| 1,669,776 | A | * | 5/1928 | Osburn | 73/292 |
| 2,887,879 | A | * | 5/1959 | Vonnegut | 73/204.19 |
| 3,246,521 | A | * | 4/1966 | Humphrey | 374/148 |

(Continued)

FOREIGN PATENT DOCUMENTS

| DE | 2247960 A | * | 4/1974 |
| DE | 3434011 A | * | 3/1986 |

(Continued)

OTHER PUBLICATIONS

IONX Edge Asset Monitoring System—Information from the Edge; www.ionxlive.com; copyright 2009; 2 pages.

*Primary Examiner* — Gail Kaplan Verbitsky
(74) *Attorney, Agent, or Firm* — Whyte Herschboeck Dudek S.C.

(57) ABSTRACT

Disclosed herein is an apparatus and method for remote monitoring that includes immersing a first temperature sensor at least partially into a heat transfer material situated in a thermo-well of a mobile container housing a material for transport, wherein the first temperature sensor includes a conductor routed through a first passage of a fitting, while providing access to the thermo-well for the insertion of a second temperature sensor through a second passage of the fitting, and receiving a signal from the first temperature sensor at a remote communication unit secured at least indirectly to the mobile container, wherein the signal is representative of the temperature of the material being transported.

10 Claims, 7 Drawing Sheets

(56) References Cited

U.S. PATENT DOCUMENTS

| | | | | |
|---|---|---|---|---|
| 4,630,028 | A | * | 12/1986 | Kelly et al. .................... 340/449 |
| 5,163,321 | A | * | 11/1992 | Perales ....................... 73/152.52 |
| 5,460,043 | A | * | 10/1995 | Terajima ..................... 73/504.12 |
| 8,038,345 | B2 | * | 10/2011 | Stoll et al. ..................... 374/143 |
| 2004/0233969 | A1 | * | 11/2004 | Welker .......................... 374/148 |
| 2009/0116537 | A1 | * | 5/2009 | Kurtz et al. ................... 374/143 |

FOREIGN PATENT DOCUMENTS

| | | | |
|---|---|---|---|
| DE | 10338876 A1 | * | 3/2004 |
| JP | 2005102539 A | * | 4/2005 |
| RU | 2172479 C2 | * | 8/2001 |

\* cited by examiner

APPARATUS AND METHOD FOR REMOTE MONITORING

CROSS-REFERENCE TO RELATED APPLICATIONS

This application claims the benefit of U.S. provisional patent application No. 61/390,898, which was filed on Oct. 7, 2010 and entitled "Apparatus and Method for Remote Monitoring," and which is hereby incorporated by reference herein.

FIELD OF THE INVENTION

The apparatus and method relate to remote monitoring. In one aspect, the apparatus and method relate to a fitting for use with a sensor for a mobile container.

BACKGROUND OF THE INVENTION

Numerous types of vehicles such as railcars, semi-trailers, barges, etc., are configured to transport materials such as liquids and gases from one location to another. Such vehicles are provided with an integral or extraneous container for containment of the materials. In some cases, the materials being transported can include hazardous materials. During transit, contained materials can be influenced by environmental conditions, such as hot or cold ambient temperatures from outside the container, the monitoring of these materials, such as measuring temperature, can be useful in many applications, but is especially useful for hazardous materials that might be heat sensitive, reactive, volatile, or ones that tend to "auto-refrigerate" when leaking. In this regard, such hazardous materials can pose a significant safety risk, and therefore it would be advantageous to provide sensors for remotely monitoring conditions that can provide an indication that the materials have become volatile or are approaching volatility. Also, due to the various container constructions and the types of material being transported, interfacing such sensors with hazardous materials in a manner to provide an accurate and reliable indication of the condition of the materials while maintaining safety requirements can be extremely difficult.

In some cases, mobile containers will include a thermo-well (i.e., temperature well) to provide a point for manually checking the temperature of material in the container. A thermo-well is generally known in the art and is typically comprised of a tube or basin that extends into a container but remains sealed off from the material situated inside the mobile container. The thermo-well contains a material with a high heat-transfer rate, wherein heat energy is transferred between the material in the thermo-well and the material in the container, thereby allowing for the temperature of the material to be obtained by reference of a temperature reading from the thermo-well.

The use of a thermo-well can be particularly useful when the material inside a container is hazardous, temperature sensitive, and/or susceptible to contamination from outside the container, which can destroy the usability of the material, such as when the material is a consumable. The current configuration for many mobile containers, such as transport containers, is to include a thermo-well with a single access port. Using the single access port configuration and following the current compliance regulations, temperature monitoring via the thermo-well can only be conducted when the car is stationary and deemed to not be "in transportation." When the container is stationary, an operator can access the singe access port and insert a temperature probe into the thermo-well to obtain temperature data. Although, placing an operator in such close proximity to the material can be dangerous when the material is a hazardous material and various conditions exist, such as when an undesirable temperature shift has occurred and/or a safety device has failed.

Another method of monitoring a mobile container is by affixing a temperature sensor to an outer surface of the mobile container. This configuration also includes several drawbacks. More particular, the temperature sensor is subject to slow sensing of temperature changes and can also provide inaccurate and unreliable information due to a plethora of factors, such as the ambient temperature outside the container, the thickness of the mobile container walls, etc., and as such, can fail to timely and reliably detect hazardous conditions. In addition, a surface mounted temperature sensor is subject to cracking or breaking away from the outer surface of the mobile container, thereby leaving a container of hazardous material without any remote means for monitoring so as to warn personal of a safety hazard prior to approaching the container.

Further, even when using a thermo-well, other significant considerations must be addressed when the thermo-well is utilized with certain materials. In particular, all openings on hazardous material tank railcars fall under securement regulations governed by the Department of Transportation. These openings, such as the thermo-well opening, must be secured while the tank car is in transportation to prevent any accidental release of a hazardous material. Any sensor fitting that interfaces with such an opening must meet the Department of Transportation requirements and be validated through approval by the Association of American Railroads.

SUMMARY

In at least one embodiment, the apparatus and method for remote monitoring includes: a) immersing a first temperature sensor at least partially into a heat transfer material situated in a thermo-well of a mobile container housing a material for transport, wherein the first temperature sensor includes a conductor routed through a first passage of a fitting; b) providing access to the thermo-well for the insertion of a second temperature sensor through a second passage of the fitting; c) receiving a signal from the first temperature sensor at a remote communication unit secured at least indirectly to the mobile container, wherein the signal is representative of the temperature of the material being transported; and d) transmitting the signal from the remote communication unit to a base communication unit via a communication signal.

In another embodiment, the apparatus and method for remote monitoring includes: a) a tubular body portion having a body first end including an access port configured to provide access to a thermo-well of a container, and a body second end including a container port securable to the thermo-well, wherein the access port is in communication with the container port via a body portion inner passage; b) a tubular branch portion having a branch first end including a branch port, and a branch second end that extends from the body second end, where the branch port is configured to receive a sensor conductor and is in communication with the body portion inner passage via a branch portion inner passage; c) an access cap removably secured to the access port; d) a branch cap secured to the branch port; and e) a tube extending through the branch cap, the tube having a tube first end, a tube second end, and a tube passageway between the tube first end and the tube second end, with at least one of the tube first end and the tube second end having a seal fitting, wherein the seal fitting is configured to accommodate a sensor conductor extending therethrough.

In still another embodiment, the apparatus and method for remote monitoring includes: a) immersing a first sensor at least partially into at least one of a first material situated in a container and a second material situated in a thermo-well, where the first sensor includes a conductor routed through a first passage of a fitting; b) providing access to the at least one of a first material situated in a container and a second material situated in a thermo-well for the insertion of a second sensor through a second passage of the fitting; and c) receiving a signal from the first sensor at a remote communication unit, where the signal is representative of the at least one of a first material situated in a container and a second material situated in a thermo-well.

In still yet another embodiment, the apparatus and method for remote monitoring includes: a) a tubular body portion having a body first end including an access port for providing access to the thermo-well, and a body second end including a container port for mounting adjacent the thermo-well, wherein the access port is in communication with the communication port via a body portion inner passage; b) a tubular branch portion having a branch first end including a branch port, and a branch second end that extends from the body second end, where the branch port is configured to receive a sensor conductor and is in communication with the body second end via a branch portion inner passage; c) an access cap removably secured to the access port; and d) a branch cap removably secured to the branch port, the branch cap including a tube extending through the branch cap, the tube having a tube first end, a tube second end, and a tube passageway between the tube first end and the tube second end, with at least one of the tube first end and the tube second end having a seal fitting, wherein the seal fitting is configured to accommodate a sensor conductor extending therethrough.

In an additional embodiment, the apparatus and method for remote monitoring includes: a) immersing a sensor at least partially into a heat transfer material situated in a thermo-well of a mobile container housing hazardous materials, where the sensor includes a conductor routed through a first passage of a fitting; b) providing access to the thermo-well for a temperature probe through a second passage of the fitting; c) receiving a temperature signal from the sensor at a remote communication unit secured to the mobile container, where the temperature signal is representative of the temperature of the hazardous material; and d) transmitting the temperature signal to a base communication unit via a wireless satellite network.

BRIEF DESCRIPTION OF THE DRAWINGS

Embodiments of the apparatus and method for remote monitoring are disclosed with reference to the accompanying drawings and are for illustrative purposes only. The apparatus and method for remote monitoring is not limited in its application to the details of construction or the arrangement of the components illustrated in the drawings. The apparatus and method for remote monitoring is capable of other embodiments or of being practiced or carried out in other various ways. Like reference numerals are used to indicate like components. In the drawings.

DETAILED DESCRIPTION OF THE PREFERRED EMBODIMENT

Figure 1:
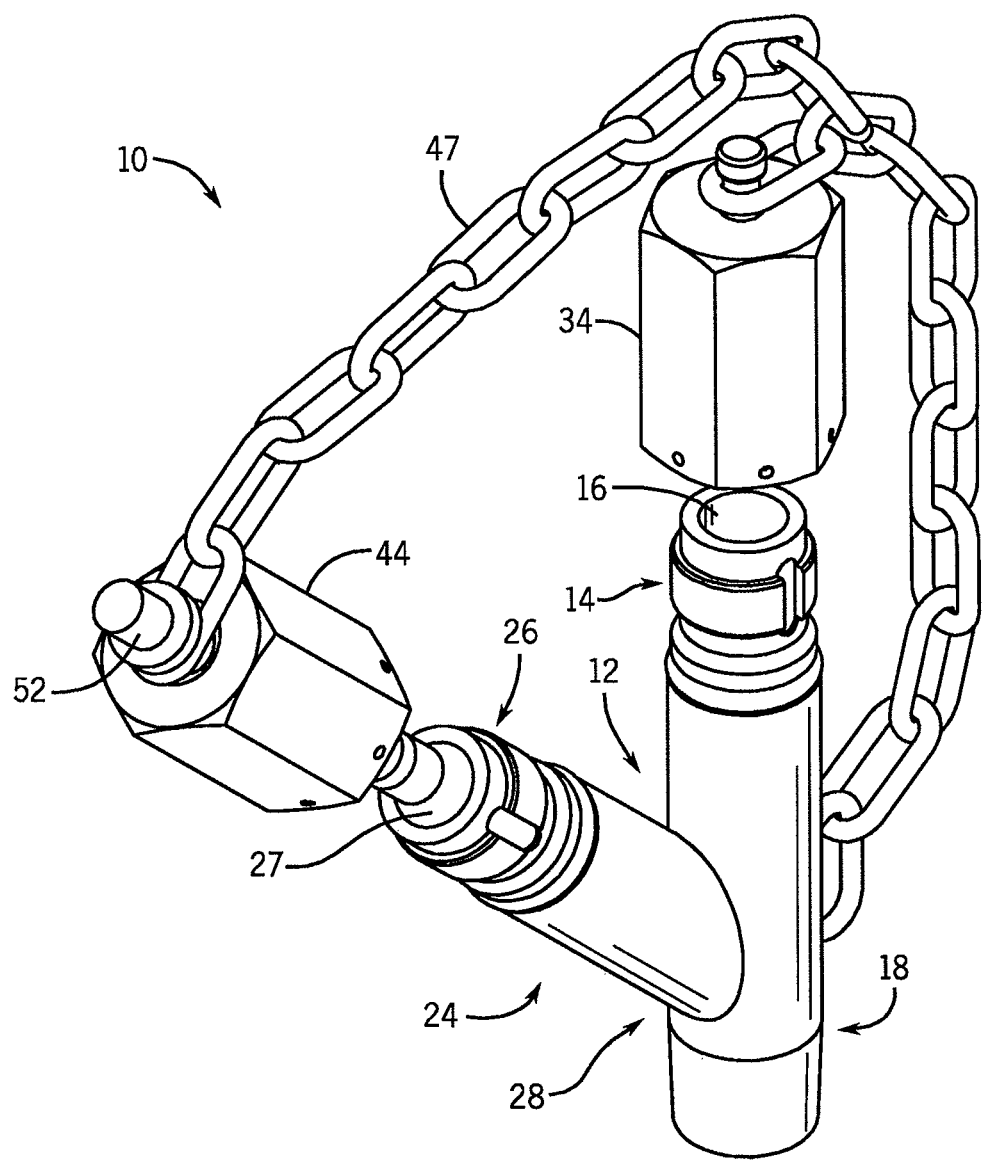
FIG. 1 is a perspective view of an exemplary fitting, in accordance with at least some embodiments.

Referring to FIG. 1, an exemplary fitting 10 is provided for accommodating the installation of a sensor inside a thermo-well of a mobile container. The mobile container is used to transport various materials in gas and/or liquid form. The sensor can be positioned within the thermo-well, with the fitting 10 providing a sealed connection point for a sensor conductor (i.e., a lead wire) to be routed from outside of the mobile container to inside the thermo-well and connected to the sensor. The sensor conductor can then be routed from outside the fitting 10 to a remote communication unit situated outside the mobile container. In this regard, a sealed connection is provided for the sensor and the integrity of the mobile container is not compromised. The remote communication unit is operable to communicate the sensor data to a base communication unit for review and/or retransmission of the sensor data.

In addition to facilitating remote monitoring through the fitting 10 during transit of the mobile container, the fitting 10 also provides a secondary access point. The combination of first and second access points in the fitting 10 allows for an additional sensor device, such as a temperature probe, to be manually inserted in and removed from the thermo-well when the mobile container is not in transit, such as during the loading and offloading process. In critical situations, the flexibility of both local and remote monitoring can prevent an operator from approaching a container that would otherwise unknowingly be in a hazardous condition. In addition, the ability to access sensor data from two sources allows for verification of a safe or unsafe condition, in the event that one sensor fails or is suspected of failing.

Figure 2:
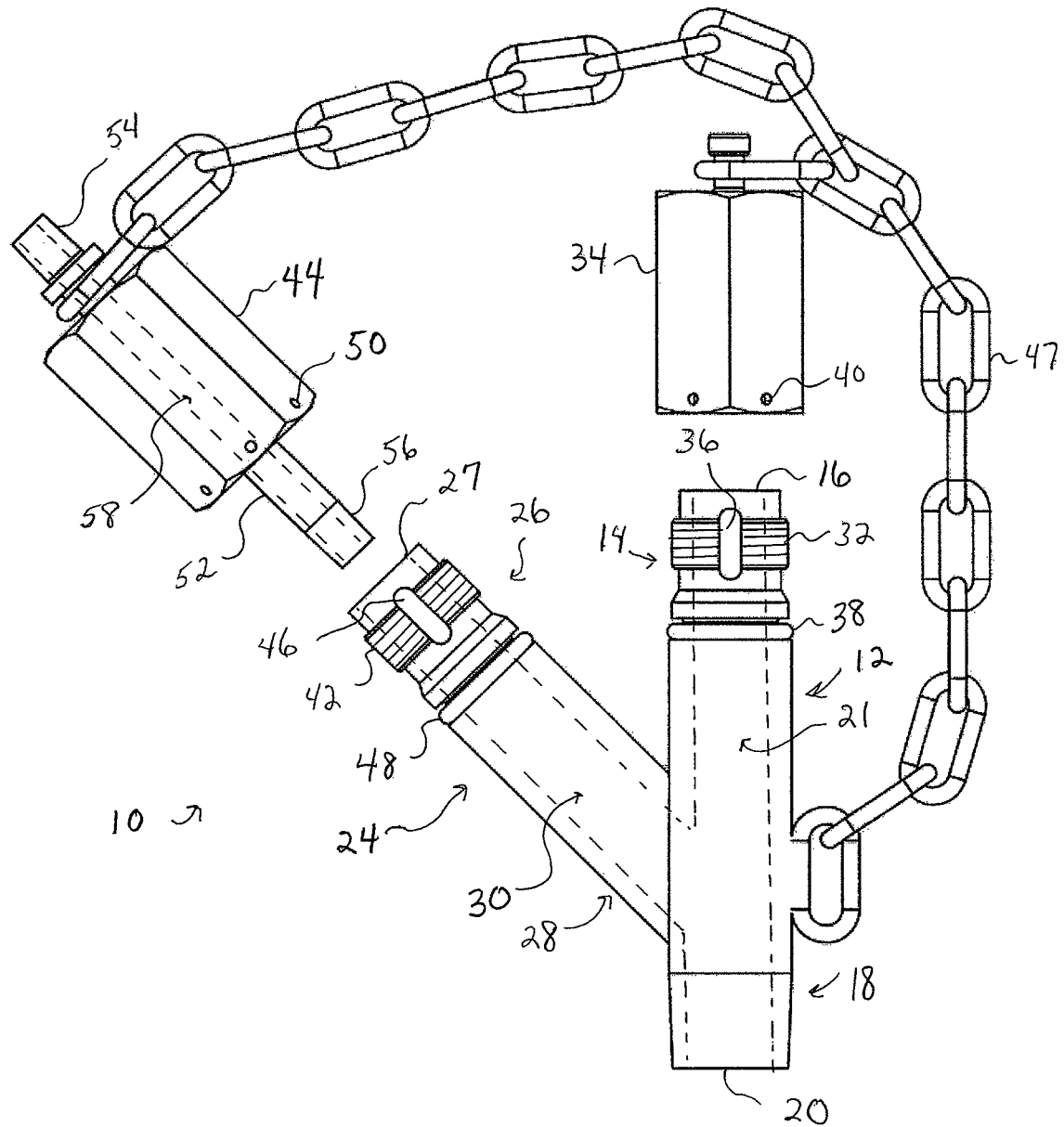
FIG. 2 is a side view of the fitting of FIG. 1, in accordance with at least some embodiments.

As seen in FIGS. 1 and 2, one embodiment of the fitting 10 includes an elongated tubular body portion 12 having a body first end 14 with an access port 16 and a body second end 18 with a container port 20. The access port 16 is in communication with the container port 20 via a body portion inner passage 21 that extends through the body portion 12. In at least one embodiment, the container port 20 is positioned at least partially inside a thermo-well 72 (see FIG. 4) of a mobile container 70 (see FIG. 4). In addition, the fitting 10 includes a tubular branch portion 24 that extends from the body portion 12. The tubular branch portion 24 has a branch first end 26 with a branch port 27 and a branch second end 28 that is secured to the body portion 12. The branch port 27 is in communication with the container port 20 via a branch portion inner passage 30 that extends through the branch portion 24 and into the body second end 18.

The body first end 14 includes a threaded portion 32 for matingly engaging an access cap 34 having internal threads (not shown). Further, the body first end 14 includes a slot 36 that extends through the threaded portion 32 and into the body portion inner passage 21. A sealing ring 38 is provided to seal the access cap 34 to prevent leakage from the body portion inner passage 21 to the atmosphere when the access cap 34 is threaded completely onto the body first end 14. The access cap 34 further includes one or more pressure passages 40 extending through the access cap 34, which are sealed by the sealing ring 38 upon installation of the access cap 34. The pressure passages 40 in combination with the access cap 34 and the slot 36 provide a leak detection mechanism. More particularly, when the access cap 34 is partially unscrewed to unseal the pressure passages 40, excess pressure that may have accumulated in the body portion inner passage 21 passes through the slot 36 and exits the pressure passages 40. The release of pressure in this manner provides an audible alert that an excessive pressure is present at the fitting 10.

Similarly, the branch first end 26 includes a threaded portion 42 for matingly engaging a branch cap 44 having internal threads (not shown). Further, the branch first end 26 includes a slot 46 that extends through the threaded portion 42 and into the branch portion inner passage 30. A sealing ring 48 is provided to seal the branch cap 44 against the branch first end 26 when the branch cap 44 is threaded completely onto the branch first end 26. The branch cap 44 further includes one or more pressure passages 50 extending through the branch cap 44, which are sealed by the sealing ring 48 upon installation of the branch cap 44. The pressure passages 50 in combination with the branch cap 44 and the slot 46 provide a leak detection mechanism. More particularly, when the branch cap 44 is partially unscrewed to unseal the pressure passages 50, excess pressure that may have accumulated in the branch portion inner passage 30 passes through the slot 46 and exits the pressure passages 50. The release of pressure in this manner provides an audible alert that an excessive pressure is present at the fitting 10. Alternatively, the branch cap 44 can be permanently secured to the branch first end, such as by welding, or formed integrally with the branch first end.

In at least one embodiment, the body portion 12 and the branch portion 24 are comprised of stainless steel tubes having a diameter of about three-quarters of an inch, although in other embodiments the body portion 12 and the branch portion 24 can be comprised of other materials and can vary in size and shape according to the application. In addition, the access cap 34 and/or the branch cap 44 can be tethered to the body portion 12 by a fastener, such as a chain 47.

Referring again to FIG. 2, a center tube 52 is provided to extend through an aperture (not shown) in the branch cap 50. The center tube 52 interfaces with the branch cap 44 to form a seal that prevents or substantially prevents leakage between the center tube 52 and the branch cap 44. In at least one embodiment, the center tube 52 is welded to the branch cap 44, although in other embodiments various other types of fasteners and seals can be utilized to complete the interface therebetween. In at least some embodiments, the center tube 52 and the branch cap 50 can be integrated as a single piece or include additional components that function as the center tube 52 and the branch cap 50. The center tube 52 includes a tube first end 54 and a tube second end 56, with a tube passageway 58 extending through the center tube 52. The tube second end 56 is sized to fit through the branch port 27 and into the branch portion inner passage 30 when the branch cap 50 is installed onto the branch first end 26. In at least one embodiment, the center tube 52 is comprised of an elongated stainless steel tube having a diameter of about one-eighth of an inch, although in other embodiments the center tube 52 can be comprised of other materials and can vary in size and shape according to the application.

Figure 3:
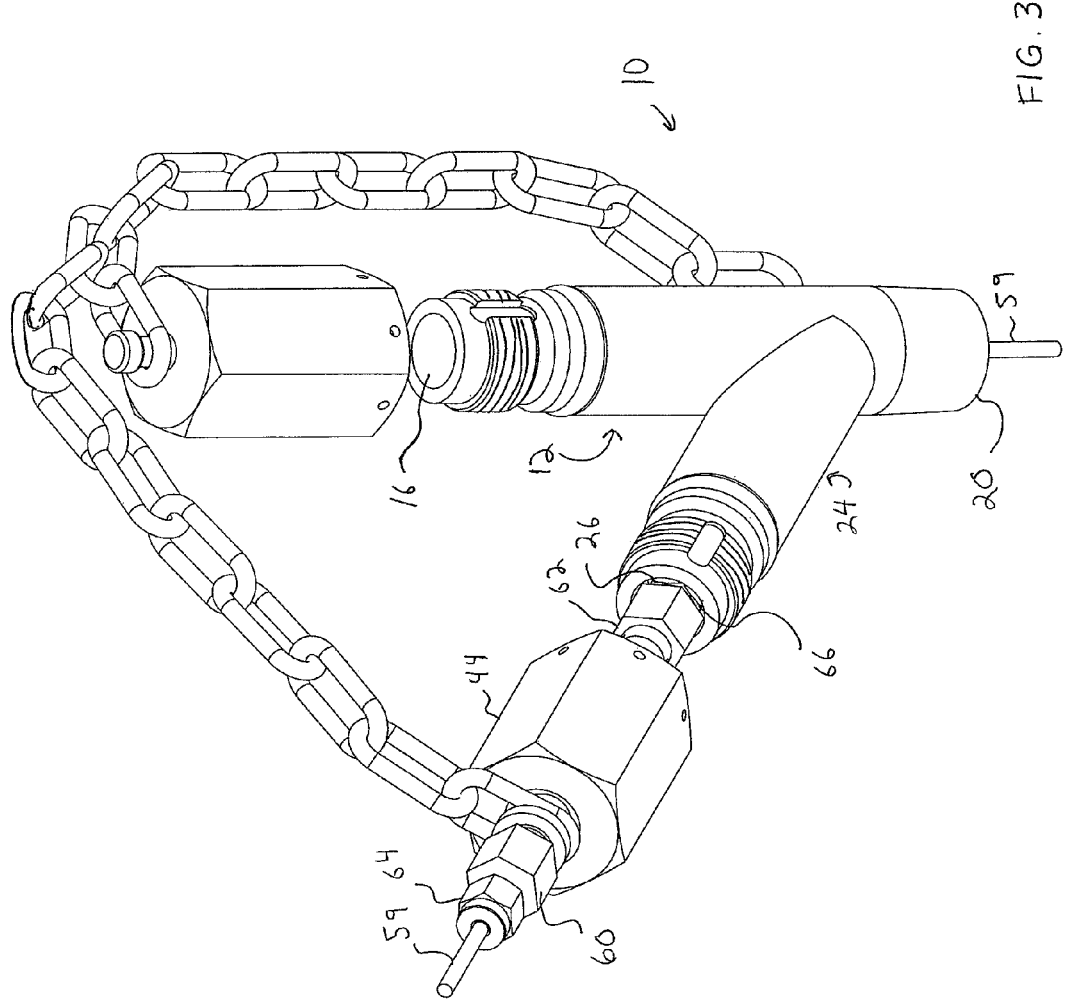
FIG. 3 is a perspective view of the fitting of FIG. 1 accommodating a sensor conductor, in accordance with at least some embodiments.
Figure 4:
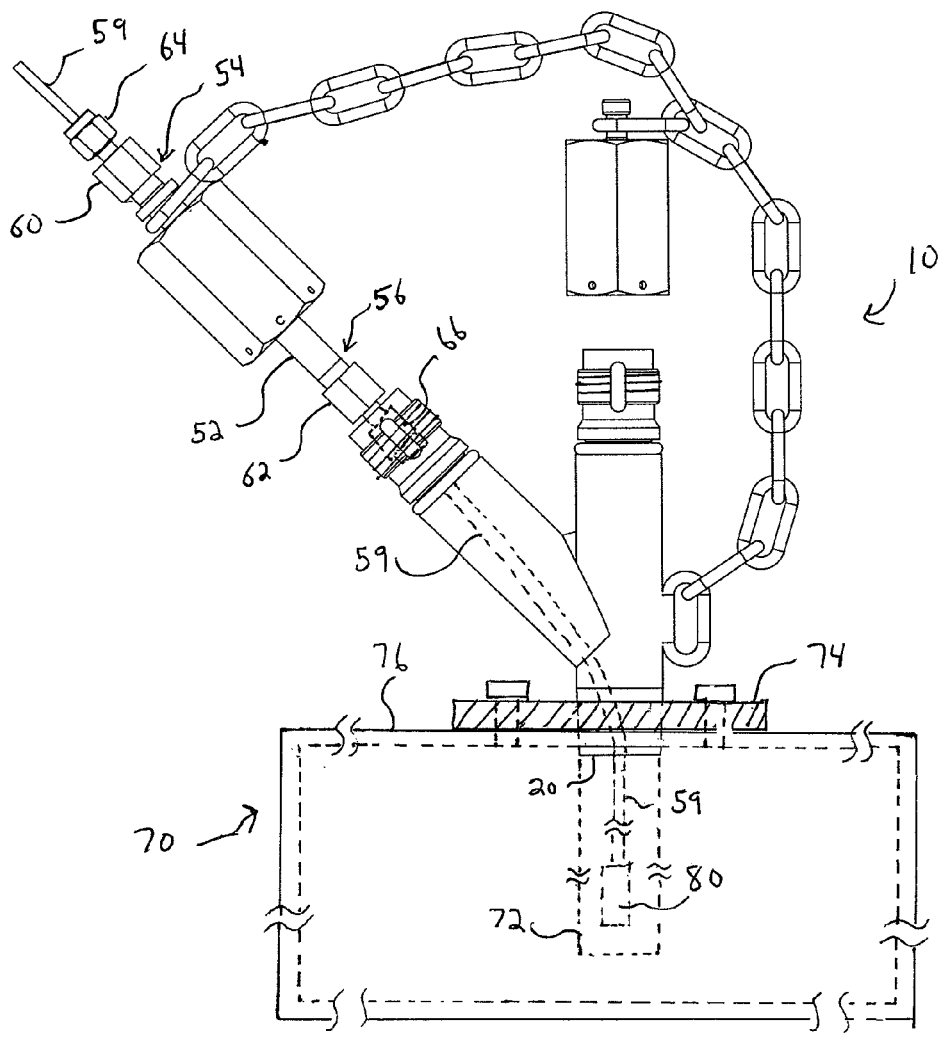
FIG. 4 is a side view of the fitting of FIG. 3 accommodating a sensor conductor and secured to a mobile container, in accordance with at least some embodiments.

Referring now to FIGS. 3 and 4, fitting 10 is depicted with a sensor conductor 59 extending through the fitting 10, where the sensor conductor 59 is configured to transmit a signal from a sensor 80. In at least one embodiment, the sensor 80 is a thermal sensing device, such as a thermocouple or a resistance thermal device (RTD) (for example a model 300385 sensor, as manufactured by IONX, located in Westchester, Pa.), although in other embodiments the sensor can be one or more of various other sensor types, such as a pressure transducer, humidity sensor, pH sensor, etc. Although only one sensor conductor 59 is depicted, representing a single sensor having a single conductor, it has been contemplated that more than one sensor conductor 59 could be passed through the fitting 10 to accommodate one or more sensors. Further, in at least one embodiment, the sensor conductor 59 is a metal-core wire, although in other embodiments, the sensor conductor 59 can include other sensor signal transmission paths, such as a pressure tube, fiber-optic cable, etc., to accommodate various types of sensors.

The sensor conductor 59 passes through the branch cap 44 using the center tube 52. By utilizing the center tube 52, the fitting 10 serves to provide a sealed path for the sensor conductor 59 to exit the fitting 10 through the branch portion 24. The sealing of the sensor conductor 59 about the center tube 52 is accomplished primarily by a first compression fitting 64 and a second compression fitting 66, which are provided to form a seal around the interface of sensor conductor 59 with the branch portion 24. The compression fitting 66 provides a primary seal and the compression fitting 64 provides a back-up/secondary seal. The tube first end 54 and the tube second end 56 each include threads for matingly engaging a first adapter 60 and a second adapter 62, respectively, with the first adapter 60 threaded to matingly engage the first compression fitting 64 and the second adapter 62 threaded to matingly engage the second compression fitting 66. In at least one embodiment, the tube ends 52, 54 are configured to matingly engage compression fittings 64, 66 without the use of adapters 60, 62. Although compression fittings 64, 66 have been described, other sealing mechanisms can be used in place of or in addition to compression fittings 64, 66, for example liquid sealants.

Referring again to FIG. 4, the fitting 10 is used in conjunction with a mobile container 70, such as a railcar tank, where the mobile container 70 includes a thermo-well, such as a thermo-well 72. The fitting 10 is interfaced with the mobile container 70 and the thermo-well 72 using one or more of various fastening methods, such as welding, bolting, screwing, gluing, etc. In at least one embodiment, the fitting 10 is fastened to a pressure/accessory plate 74 that is secured to a surface 76 of the mobile container 70. In at least one embodiment, the fitting 10 is configured to provide a sealed passage for the sensor conductor 59 to extend from the thermo-well 72 to the atmosphere, where the container port 20 is positioned in or forms part of the thermo-well 72.

Utilizing the fitting 10, the sensor 80 connected to the sensor conductor 59 can be immersed in a heat transfer liquid (or other medium having good heat transfer properties) that is inside the thermo-well 72, while the sensor conductor 59 is passed through the container port 20 into the branch portion passage 30 (FIG. 2), and through the center tube 52 via the compression fittings 66, 64. In this manner, the sensor 80 can provide a sensor signal by using the conductor 59, without breaching a seal between the thermo-well 72 and the atmosphere. In addition, by providing the branch portion 24 in addition to the body portion 12, local manual access to the thermo-well 72 is provided through the access port 16 of the elongated tubular body portion 12 by removing the access cap 34. Such manual access allows an operator to manually insert a sensor, such as a temperature probe 71 (FIG. 6) into the thermo-well 72 without compromising the sealed connection of the conductor 59 through the branch portion 24. Further, such manual access through the access port 16 allows the sensor 80 to continue to provide data to a remote source, such as the remote communication unit 90 (FIG. 8), before, during, and after manual testing is performed. In addition, the straight path of the body portion 12 allows for easy insertion of a rigid or flexible testing device without interference from the branch portion 24, which is angled away from the body portion 12. By sealing the aforementioned fitting 10 as described above, the fitting satisfies the Department of Transportation requirements and thus has been approved by the Association of American Railroads.

Figure 5:
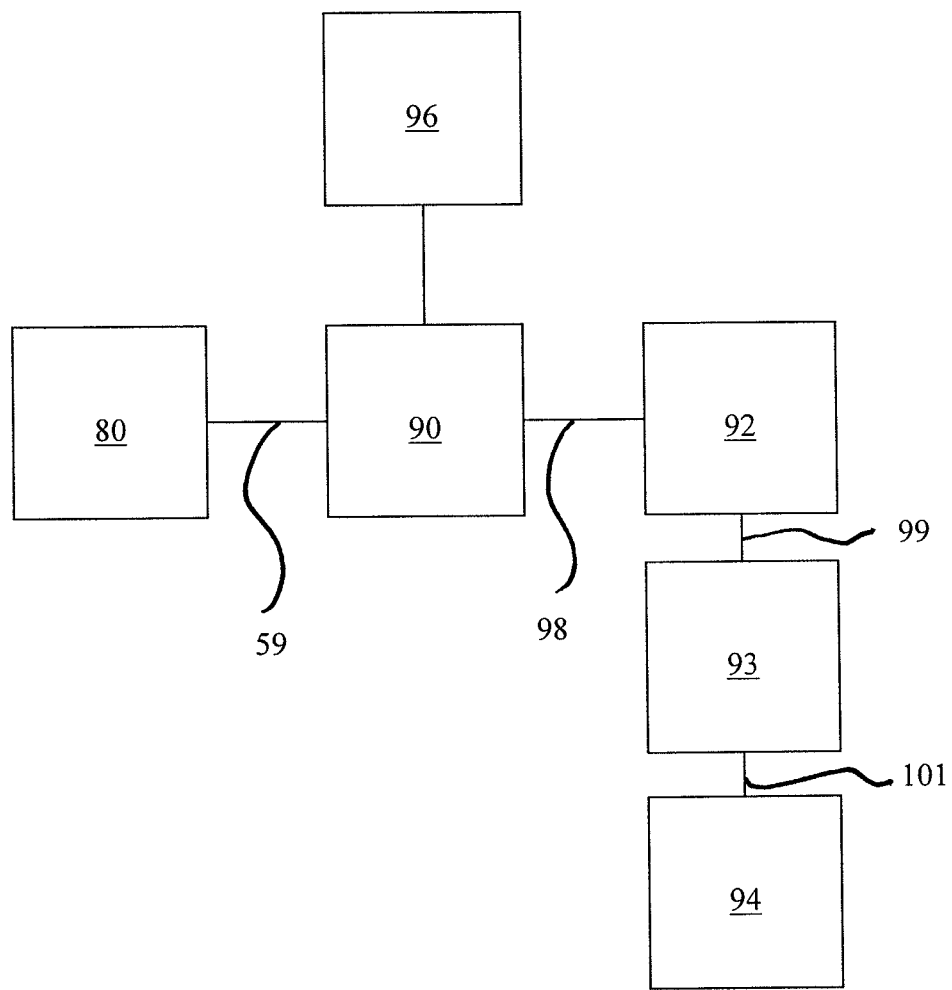
FIG. 5 illustrates a schematic view of a remote monitoring system, in accordance with at least some embodiments.

Referring now to FIG. 5, the sensor signal from the sensor 80 can be utilized in numerous ways. In particular, the sensor conductor 59 can be routed to a remote communication unit 90, such as an Edge Series 2 Monitoring System, as manufactured by IONX. The remote communication unit 90 is capable of receiving the sensor data and transmitting the data to a base communication unit 92 using communication signals, such as wireless signals 98. In at least some embodiments, the wireless signals 98 can communicate via a wireless satellite network, although in other embodiments, the wireless signals can include cellular signals, Radio Frequency signals, etc. In at least one embodiment, the remote communication unit 90 and base communication unit 92 each include a transceiver. Although not shown, the remote communication unit 90 can also be configured for direct mounting on the fitting 10, thereby eliminating the need for an extended length conductor. The remote communication unit 90 can be configured to transmit the sensor data to the base communication unit 92 on specific intervals and/or upon specific request.

The remote communication of sensor data can be useful for any material stored in a container, although with regard to hazardous materials in particular, the sensor data can be crucial to safety. The term hazardous materials includes materials defined as hazardous by the United States Department of Transportation (DOT) under the Hazardous Materials Regulations 49 CFR Parts 100-185, for example ethylene oxide. Using the fitting 10 along with the sensor 80, hazardous materials stored in the mobile container 70 can be remotely monitored in an accurate manner to identify if a hazardous situation exists or is impending. This remote monitoring eliminates the need for an operator to manually check the hazardous liquids for frailty and thereby risk personal harm. In addition, by providing remote access to periodic data, the mobile container 70 can be identified and re-routed to a more desirable location prior to an incident, if a hazardous situation is developing or imminent, or after a failure has occurred. In the case of a non-hazardous material, such as a consumable material that is housed in the mobile container 70, the fitting 10 provides a sealed connection to the mobile container 70 that allows for accurate and more reliable remote temperature monitoring, along with the ability to manually check the temperature without risking contamination of the material.

The base communication unit 92 is capable of communication with one or more devices for processing the sensor data, such as a computer network system 93, using a communication path 99 (e.g., wireless, wired, network system). The computer network system 93 can process the sensor data and compare it with pre-determined temperature alarm values and trends and then provide notifications to other communication devices 94 such as pagers, cellular telephones, remote computer terminals, etc., using a communication path 101 (e.g., wireless, wired, network system), when an alarm value or trend is measured.

As the fitting 10 allows for the accurate monitoring of the temperature (sensor data) inside the mobile container 70, the sensor data can also be utilized at least indirectly as a pressure indicator, or to provide other desired direct/indirect data. For example, if a pressure relief device (not shown) on a mobile container 70 has been activated and then fails to properly close, an associated drop in temperature will be noticed, which in conjunction with other factors can identify the possible failure of the pressure relief device or another issue. Likewise, a substantial increase in temperature, in conjunction with other factors, can serve as an indication that a pressure relief device has failed to open, thereby excessive pressure may be building in the mobile container 70. This data can be coordinated with other known factors, such as outside temperature, to identify possible failures. In addition, this data analysis can also be used to trigger one or more alarm values as designated by the computer network system 93. Further, the remote communication unit 90 can be configured to receive signals from multiple sensors, such as global positioning sensors 96, ambient temperature sensors, and pressure sensors. By using the remote communication unit 90 in conjunction with one or more sensors, the mobile container 70 can be position tracked, and the materials therein can be accurately monitored.

As discussed above, the monitoring of hazardous materials being transported can be particularly important, such as in the case of the hazardous material ethylene oxide. Under DOT regulations, it is transported as a flammable gas, and meets the definition of a compressed gas because its boiling point is 50.8 degrees F. In most cases, at ambient temperature and pressure it is a gas, but because it is shipped under pressure, the ethylene oxide in the mobile container is normally in a liquid form during transit. If a leak develops and the temperature is above 50.8 degrees Fahrenheit, the ethylene oxide returns to a gas form. Ethylene oxide is a temperature sensitive material because of its molecular structure. In particular, it has an oxygen molecule with a "strained" bond, meaning the oxygen molecule wants to break away. Thus, ethylene oxide can decompose at elevated temperatures and in addition, ethylene oxide is a reactive chemical. Therefore, it is important to monitor at least the temperature as it will react with almost any other material and can decompose while in transit.

In addition to hazardous materials, the sensor data can be utilized in applications that involve the transport of non-hazardous materials, such as those having a high freeze-point. These materials are heated to a temperature that maintains a liquid form so they can be transferred from a mobile container 70 to a storage tank (not shown), but the temperature must be accurately controlled and monitored to prevent excessive heat, which can damage the materials. Also, consumable and non-consumable materials can be provided in a mobile container 70 that are sensitive to one or more factors such temperature.

Figure 6:
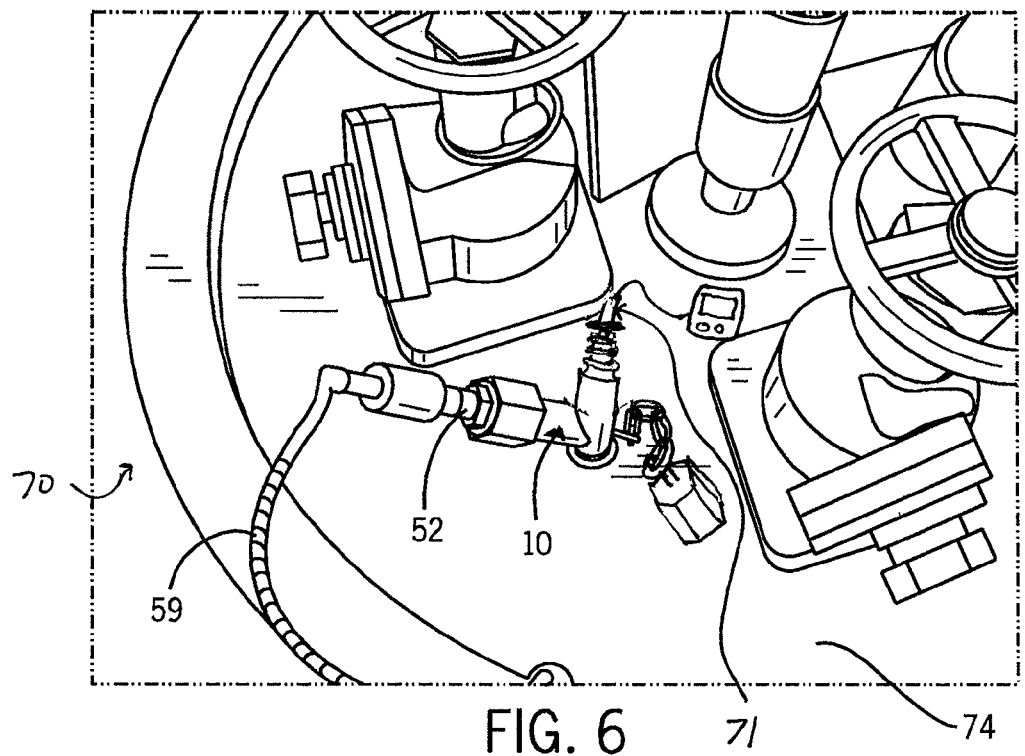
FIG. 6 illustrates an exemplary fitting accommodating an exemplary sensor conductor and secured to an exemplary mobile container.
Figure 7:
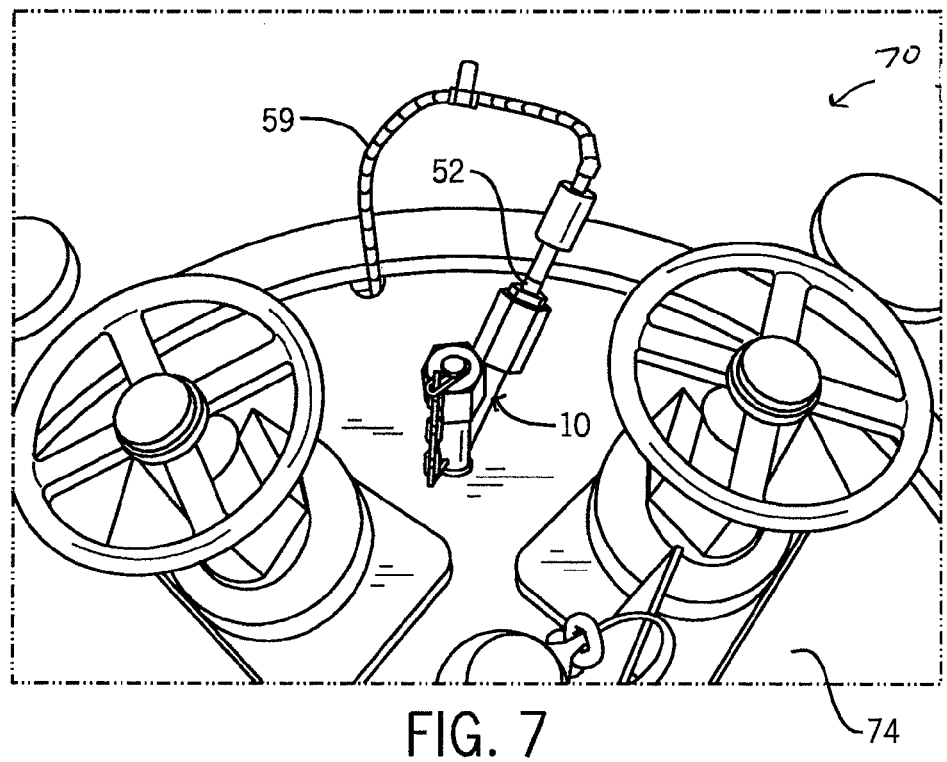
FIG. 7 illustrates an exemplary fitting accommodating an exemplary sensor conductor and secured to an exemplary mobile container.
Figure 8:
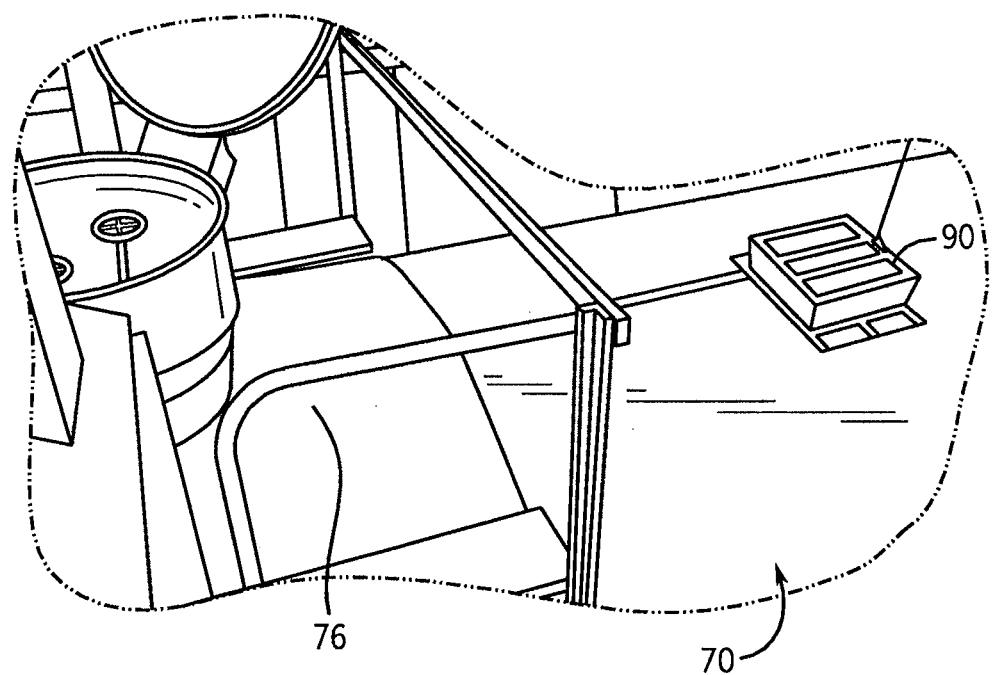
FIG. 8 illustrates an exemplary remote communication unit secured to an exemplary mobile container.

Referring now to FIGS. 6 and 7, in one exemplary embodiment, the fitting 10 is shown installed on the pressure/accessory plate 74 of the mobile container 70, wherein the mobile container 70 is a railcar tank. The sensor conductor 59 is shown extending from the fitting 10 for interfacing with the remote communication unit 90 positioned at another location on the railcar tank. FIG. 8 depicts the remote communication unit 90 secured to the surface 76 of the railcar tank.

Although the embodiments described above include particular sizes, shapes, and connection types, the apparatus and method of remote monitoring is to be understood to include various modifications to these parameters as desired to accommodate particular applications of the fitting 10. In addition, the fitting 10 is can be utilized to monitor hazardous and non-hazardous materials situated in various types of mobile and stationary containers, including containers with and without a thermo-well. It is specifically intended that the apparatus and method of remote monitoring not be limited to the embodiments and illustrations contained herein, but include modified forms of those embodiments including portions of the embodiments and combinations of portions of different embodiments as come within the scope of the following claims.

We claim:

1. An apparatus for providing access to a thermo-well situated in a mobile container, the apparatus comprising:
   a tubular body portion having a body first end including an access port configured to provide access to a thermo-well of a container, and a body second end including a container port securable to the container, wherein the access port is in communication with the container port via a body portion inner passage;
   a tubular branch portion having a branch first end including a branch port, and a branch second end that extends from the body second end, where the branch port is configured to receive a sensor conductor and is in communication with the body portion inner passage via a branch portion inner passage;
   an access cap removably secured to the access port;
   a branch cap secured to the branch port; and
   a tube extending through the branch cap, the tube having a tube first end, a tube second end, and a tube passageway between the tube first end and the tube second end, with at least one of the tube first end and the tube second end having a seal fitting, wherein the seal fitting is configured to accommodate a sensor conductor extending therethrough.

2. The apparatus of claim 1, wherein the sensor is positioned inside a thermo-well of a container that is mobile.

3. The apparatus of claim 2, wherein at least one of the tube first end and the tube second end includes a seal fitting to prevent or substantially prevent the material from exiting the container.

4. The apparatus of claim 3, wherein one or more pressure exhaust passages are provided on at least one of the access cap and the branch cap, and wherein the pressure exhaust passages are configured to serve as a leak detection indicator.

5. The apparatus of claim 2, further including a sensor conductor routed at least partially through the tube passageway, the branch portion inner passage, the body portion inner passage, and the container port.

6. The apparatus of claim 5, wherein the sensor conductor has a first conductor end and a second conductor end, with a sensor secured to the first conductor end and situated inside the thermo-well.

7. The apparatus of claim 6, wherein the second conductor end is in communication with a first communication unit.

8. The apparatus of claim 7, wherein the first communication unit is in communication with a second communication unit.

9. The apparatus of claim 8, wherein the second communication unit is in communication with a computer system capable of providing remote access to sensor data.

10. The apparatus of claim 1, wherein the material is a hazardous material.

* * * * *

UNITED STATES PATENT AND TRADEMARK OFFICE
CERTIFICATE OF CORRECTION

PATENT NO. : 8,858,075 B2  
APPLICATION NO. : 13/251605  
DATED : October 14, 2014  
INVENTOR(S) : Dave Douglas and Jim Trippett Page 1 of 1

It is certified that error appears in the above-identified patent and that said Letters Patent is hereby corrected as shown below:

Title page item (73) Assignee:
replace "Glycois" with --Glycols--

Signed and Sealed this
Sixth Day of January, 2015

Michelle K. Lee
*Deputy Director of the United States Patent and Trademark Office*